Dec. 27, 1955   E. O. CLARK ET AL   2,728,194
CONTROL CIRCUIT FOR HYDRAULIC POWER TRANSMISSION
Filed March 29, 1954
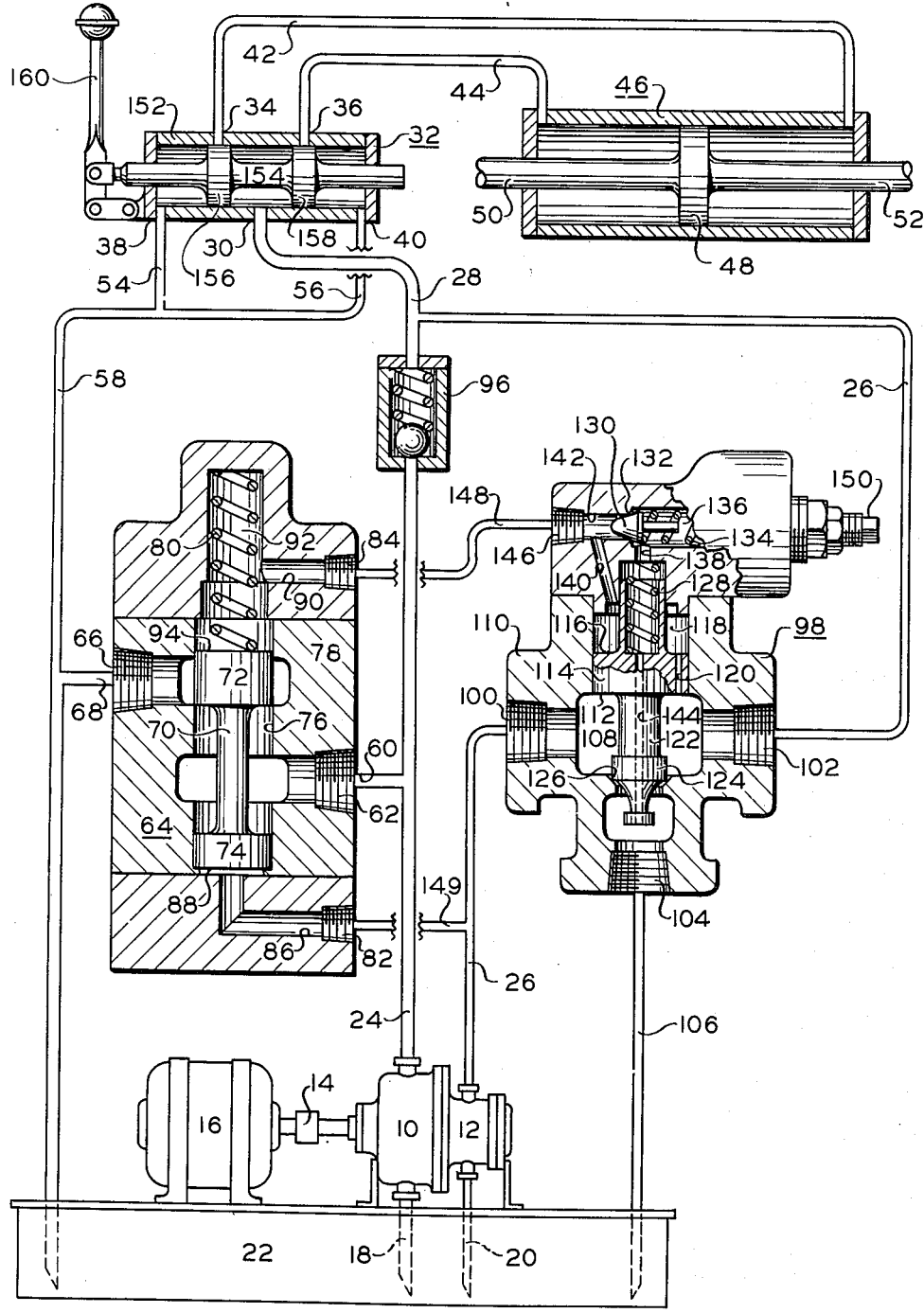
INVENTORS
EVERETT O. CLARK
MILTON R. FOX
BY
Ralph R. Truesdale
ATTORNEY United States Patent Office 2,728,194
Patented Dec. 27, 1955

2,728,194
CONTROL CIRCUIT FOR HYDRAULIC POWER TRANSMISSION

Everett O. Clark, Birmingham, and Milton R. Fox, Detroit, Mich., assignors to Vickers Incorporated, Detroit, Mich., a corporation of Michigan Application March 29, 1954, Serial No. 419,461

12 Claims. (Cl. 60—52)

This invention relates to power transmissions, and is particularly applicable to those of the type comprising two or more fluid pressure energy translating devices, one of which may function as a pump and another as a fluid motor.

The invention is generally concerned with hydraulic power transmission control systems and more particularly as used in various machine tools to drive the tool or work carriages thereof.

Control systems for machine tools providing the usual rapid traverse and feed rate have become standardized and are readily obtainable. One of such systems utilizes a pair of positive displacement fluid pumps mechanically coupled to a prime mover and the separate delivery conduits of each pump lead to a main delivery conduit which may be selectively connected to opposite ends of a fluid motor for driving the machine tool load device. Valving is utilized which permits both pumps to deliver their displacement at low pressure to produce the traverse movement and at a relatively higher pressure to unload the pump having the larger displacement back to a tank. The smaller displacement pump continues to deliver into the delivery conduit at a relatively higher pressure to produce the feed movement. A system of the type recited is disclosed in the patent to Vickers, No. 1,982,711. A flow control valve is incorporated in the circuit in the line adapted to return fluid from the motor during a feed operation and which may be by-passed during the traverse movement. A pressure relief valve is also utilized to exhaust to the tank fluid from the smaller displacement pump in excess of the flow regulating valve setting as determined by the feed requirements of the system.

Occasionally however, a need arises for a cycle or type of operation in which the conventional control transmission previously explained is unsuited. There are occasions, for example, when the pressure at which the large pump is to be unloaded is critical in relation to the pressure setting at which the relief valve in the system is operated to govern the feed operation. When there are a multiplicity of pressure responsive valves, each of which is adjustable to a predetermined setting to govern, for example, both the traverse and feed operations of a machine tool circuit, the system becomes inefficient and sometimes inoperative through carelessness or ineptitude in adjusting the multiplicity of pressure settings.

It is therefore an object of this invention to provide an improved power transmission control system of the general type recited.

It is a further object of this invention to provide a power transmission control system as recited in which more accurate control of the unloading of one pump and the delivery feed pressure of the other pump is attained.

It is also an object of this invention to provide an economical, accurate, and efficient power transmission control system which will be operative over a long and useful life.

Further objects and advantages of the present invention will be apparent from the following description, reference being had to the accompanying drawing wherein a preferred form of the present invention is clearly shown.

In the drawing the single figure is a diagrammatic view of a hydraulic power transmission system embodying a preferred form of the present invention.

Referring now to the single figure, there is shown two positive but dissimilar displacement fluid pumps 10 and 12 mechanically coupled at 14 to an electric motor 16. The pumps 10 and 12 are respectively connected by supply conduits 18 and 20 to a supply tank 22 and have delivery conduits 24 and 26 leading to a main pressure delivery conduit 28, the latter conduit being connected to a pressure port 30 of a directional control valve 32. The control valve 32 is also provided with motor ports 34 and 36 and tank ports 38 and 40. The motor ports 34 and 36 are respectively connected by conduits 42 and 44 to the opposite ends of a fluid motor 46 having a piston 48 reciprocally mounted therein associated with which are piston rods 50 and 52 extending from the motor for driving a load device such as a machine tool, not shown. The tank ports 38 and 40 are connected by conduits 54 and 56 to a main tank conduit 58 leading to the tank 22.

The delivery conduit 24 of the larger displacement pump 10 is connected by a branch conduit 60 to the inlet port 62 of a by-pass or unloading valve 64, the outlet port 66 of which is connected by a branch conduit 68 to the tank conduit 58. A spool valve 70 having lands 72 and 74 is reciprocally mounted in a bore 76 of the housing 78 of the valve. The spool 70 is normally biased to the position shown with land 72 blocking communication between the inlet and outlet ports 62 and 66 by means of a spring 80 of predetermined resistance. The housing 78 is also provided with two control ports 82 and 84, port 82 being connected by a passage 86 to the underside of land 74 which is indicated by the numeral 88, and port 84 being connected by a passage 90 to a control chamber 92 in which spring 80 is mounted and in which the upper side of land 72 indicated by the numeral 94 is exposed. The surfaces 88 and 94 of the lands 74 and 72 are substantially balanced so that with equal pressure thereon the valve remains in closed position but when the port 84 is vented and a differential pressure is created on the opposed surfaces of the lands of a value equal to the resistance of spring 80 the spool 70 will shift upwardly and land 72 will open inlet port 62 to the outlet port 66. A check valve 96 in the delivery conduit 24 is maintained in the closed position by the delivery pressure of pump 12 conducted to the closing side thereof when the valve spool 70 is operated to the open position and the delivery of pump 10 is then unloaded at negligible pressure to the tank 22 through the unloading valve 64.

Incorporated in the delivery conduit 26 of the smaller displacement pump 12 is a by-pass valve 98 having both its inlet and outlet ports 100 and 102 connected to the delivery conduit 26. The by-pass valve 98 is also provided with a by-pass port 104 connected to tank 22 by means of a conduit 106. The inlet and outlet ports 100 and 102 are connected to an inlet chamber 108 provided in the housing 110. The undersurface 112 of a piston 114 is exposed to pressure in the inlet chamber 108. The opposed upper surface 116 of the piston 114 is exposed to pressure in a control chamber 118, the inlet chamber 108 being connected to the control chamber 118 by a restricted passage 120 in the piston 114. The piston 114 operates a spool 122, the lower end of which is provided with a valve 124 which normally closes a seat opening 126 connected to the by-pass port 104. The spool and valve carried by the piston are biased to the closed position shown by a spring 128 of predetermined resistance. With the delivery pressure of the smaller displacement pump 12 acting on the opposed piston surfaces 112 and 116 the valve is balanced and remains in the closed position.

The control chamber 118 may be vented by a pilot relief valve indicated by the numeral 130 which normally closes a seat opening 132 by reason of a spring 134 biasing the valve to the position shown. The spring 134 is mounted in a chamber 136 connected to the control chamber 118 by a passage 138. When the pilot relief valve 130 is operated to the open position, the control chamber is vented at a controlled pressure to the by-pass port 104 by means of a passage 140 leading to a passage 142, at one end of which is the valve seat 132, and a passage 144 extending through the piston 114, the spool 122 and the valve 124. The passage 142 leading to the pilot relief valve 130 is provided with an external connection control port 146 which is connected by a conduit 148 to the control port 84 of the by-pass valve 64. The delivery conduit 26 of the smaller pump 12 is connected to the control port 82 of by-pass valve 64 by a branch conduit 149. In this manner the delivery pressure of the smaller displacement pump 12 is not only conducted to the underside of the land 74 and piston 114 of the by-pass valve 64 and 98, but also conducted to the upper side of land 72 and the upper side of piston 114 of the by-pass valves 64 and 98. The pilot relief valve 130 thus controls the venting of the control chambers of both by-pass valves 64 and 98. The areas of the lands 72 and 74 and the opposed areas of the piston 114 exposed to the delivery pressure of the smaller displacement pump 12 are so selected relative to the resistance of the springs which are utilized to maintain the valves closed that either substantially the same or a higher pressure differential may be required to operate the piston 114 of valve 98 and the spool 70 of valve 64. An adjusting screw 150 is provided for adjusting the tension of spring 134 of the pilot relief valve 130 for determining the delivery pressure of pump 12 at which the spool valve 70 of valve 64 and the spool 122 of valve 98 may be operated. The directional control valve 32 comprises a housing 152 reciprocally mounted within which is a spool 154 having lands 156 and 158 for controlling communication between the pressure, motor and tank ports of the valve. A handle 160 is provided for selective operation of the control spool 154.

In operation with the prime mover 16 driving the pumps 10 and 12 and with the control handle 160 of directional valve 132 operated to a spool controlling position connecting the pressure port 30 to the motor port 36 and the motor port 34 to the tank port 38, the piston 48 of the motor 46 will be operated rightwardly. During the traverse movement the displacement from pumps 10 and 12 is conducted by conduits 24 and 26 to the main delivery conduit 28 and to the pressure port 30 of directional control valve 32 and thence by means of motor port 36 and conduit 34 to the left end of motor 46. Displacement from the right end of motor 46 is conducted by conduit 42 to motor port 34 of directional valve 32 and thence by tank port 38 and conduits 54 and 58 to the tank 22.

During this operation, the delivery of pump 10 is also conducted to the inlet port 62 of by-pass valve 64 by branch conduit 60 but the land 72 of spool 70 blocks communication between the inlet port 62 and the by-pass port 66.

The delivery pressure of the smaller displacement pump 12 is transmitted to the under side 112 of piston 114 in the by-pass valve 98 and also transmitted to the control chamber 118 to act on the upper surface 116 of the piston 114 by means of the piston passage 120. The delivery pressure of the smaller displacement pump 12 is also transmitted to the under surface 94 of land 72 of the same valve by means of passage 140 leading from the control chamber 118 of by-pass valve 98, passage 142 and port 146 of the same valve, conduit 148, control port 84 of by-pass valve 64, and passage 98 and control chamber 92 of the latter valve.

When the feed movement is about to take place, the pressure arises in the delivery conduit 26 of the smaller pump 12 and when equal to the resistance of spring 134 of the pilot relief valve 130 the valve 130 will be shifted slightly from the seat 132. When the relief valve 130 is shifted from its seat to open the same, both of the control chambers 92 and 118 respectively of by-pass valves 64 and 98 will be vented to the tank 22 by means of the passage 142 at one end of which is the seat 132, passage 138, control chamber 118, passage 144 which extends through the piston 114, the spool 122 and the valve 124, by-pass 104 and conduit 106.

The same differential pressure will then be created in the valves 64 and 98 to act on the opposed operating surfaces of the piston 114 of by-pass valve 98. The springs 80 and 128 may be selected so that the spool valves 70 and 122 are operated substantially simultaneously in which case the feed movement is conducted at a pressure substantially the same as the unloading pressure of the large pump. However, the spring 128 may be selected to cause the relief valve 98 to operate at a slightly higher pressure differential than the pressure differential at which the unloading valve is operated to the open position. In the latter case, the differential pressure created on the opposed operating surfaces of valves 64 and 98 on the first opening of the pilot relief valve 130 is only sufficient to overcome the resistance of spring 80 of unloading valve 64. As the delivery pressure of the smaller displacement pump 10 is conducted to the undersurface 88 of land 74 of the valve 64 and is of a value sufficient to overcome the resistance of spring 80 and the control chamber 92 is vented to the tank so as to unbalance the opposed pressures on the valve, the spool 70 shifts upwardly and the land 72 unblocks communication between the inlet port 62 and the by-pass port 66.

The delivery pressure of the smaller pump is transmitted by conduits 26, 28 and 24 to the check valve 96 and closes the same. With by-pass valve 64 maintained to opened position the delivery of pump 10 is by-passed or unloaded to the tank 22 through the open by-pass valve 64 at negligible pressure. There will be a very slight bleed off of the delivery of pump 12 through the slightly opened pilot relief valve 130. The feed movement will continue at substantially the opening pressure of the pilot relief valve 130 as determined by the resistance and adjustable setting of the spring 134. If the pressure rises at any time slightly higher than the original opening pressure of the pilot relief valve 130, the pilot relief valve will be shifted further from its seat and the differential pressure acting on the opposed surfaces 112 and 116 of the piston 114 rises to a value sufficient to overcome the resistance of spring 128. The piston 114 and spool 122 are shifted upwardly and the valve 124 carried thereby opens the seat 126 to open the inlet port 100 to the by-pass port 104 and thus by-passing sufficient of the displacement of pump 112 to the tank 22 to produce a controlled feed movement or, for example, to maintain a predetermined clamping operating pressure.

For the purposes of simplicity and convenience, the control system has been disclosed and described without incorporating flow control mechanism therein. It should be understood, however, that the traverse and feed system may be applied to a transmission incorporating flow control mechanism which may be placed, for example, as disclosed in the patent to Vickers, No. 1,982,711 in a line of the motor adapted to return fluid during a feed movement. A simple on and off valve may be placed in the motor return feed line which is left open during the traverse movement thereby by-passing the flow control device and which is operated to the closed position just prior to a feed movement to direct motor return fluid through the flow regulating device.

It should therefore be noted that the system utilizes two by-pass valves of the balanced type which are controlled by a single pressure responsive operating means, the latter of which comprises a pilot relief valve, for controlling the venting of the control chambers of both the unloading valve and the by-pass valve. The pilot relief valve at a predetermined delivery pressure of the smaller displacement pump opens to an extent for creating a differential pressure on the opposed operating surfaces of both valves sufficient, or of a value to operate both valves or to only operate one of the by-pass valves, i. e., the valve for the larger displacement pump, to the open by-pass position followed by operation of the other by-pass valve. The resistance of the springs 80 and 128 for the valves 64 and 98 may be selected so as to cause the by-pass valve 64 to open at one differential in operating pressure and to cause the by-pass valve 98 to open at either substantially the same or a slightly higher differential in operating pressure.

The differential in the operating pressures of the valves will be low because only a small movement of the pilot valve 130 is necesary to create this differential. The opening pressures in addition may be accurately controlled by the single adjustment means, i. e., the adjustment screw 150 for the spring 134 of the pilot relief valve 130.

In addition the valves 64 and 98 are of conventional structure and need not be specially designed to perform the functions and to obtain the results desired. They need only to be placed in the circuit as proposed and extremely accurate control of the tool driven by the motor 46 is obtained.

While the form of embodiment of the invention as herein disclosed constitutes a preferred form, it is to be understood that other forms might be adopted, all coming within the scope of the claims which follow.

What is claimed is as follows:

1. In a hydraulic power transmission system including a pair of fluid pumps mechanically coupled to a prime mover and hydraulically connected in parallel to a fluid motor for driving the same, the combination of a separate by-pass valve for each pump, each valve being of the substantially balanced type operable to the open position by a predetermined operating pressure differential, a circuit connecting the delivery pressure of one of said pumps to both of said valves, and valve means responsive at a predetermined delivery pressure of the said one pump to create a pressure differential of a value for operating both of said valves to the open position.

2. In a hydraulic power transmission system including a pair of fluid pumps mechanically coupled to a prime mover and hydraulically connected in parallel to a fluid motor for driving the same, the combination of a separate by-pass valve for each pump, each valve being of the substantially balanced type operable to the open position by a predetermined operating pressure differential, each valve having resilient means biasing the valve to the closed position, the resistance of which determines the differential operating pressure at which the valve opens to the by-pass position, a circuit connecting the delivery pressure of one of said pumps to both of said valves, and valve means responsive at predetermined delivery pressures of the said one pump to create operating pressure differentials of a value for operating both of said valves to the open position.

3. In a hydraulic power transmission system including a pair of fluid pumps having different volumetric displacements mechanically coupled to a prime mover and hydraulically connected in parallel to a fluid motor for driving the same, the combination of a separate by-pass valve for each pump, each valve being of the type having substantially balanced opposed pressure responsive areas and resiliently biased to the closed by-pass position, each valve being operable to the open by-pass position by a predetermined differential operating pressure on the opposed areas thereof, a circuit connecting the delivery pressure of one of said pumps to the opposed pressure responsive areas of both of said valves, and valve means responsive at a predetermined delivery pressure of the said one pump to create a pressure differential of a value for operating both of said valves to the open position.

4. In a hydraulic power transmission system including a pair of fluid pumps having different volumetric displacements mechanically coupled to a prime mover and hydraulically connected in parallel to a fluid motor for driving the same, the combination of a separate by-pass valve for each pump, each valve being of the substantially balanced type operable to the open position by a predetermined operating pressure differential, a circuit connecting the delivery pressure of one of said pumps having the smaller volumetric displacement to both of said valves, and valve means responsive at a predetermined delivery pressure of the said one pump to create a pressure differential of a value for operating both of said valves to the open position.

5. In a hydraulic power transmission system the combination of a fluid motor, a pair of fluid pumps mechanically coupled to a prime mover and hydraulically connected in a parallel circuit to the motor for driving the same, means forming a separate by-pass in the circuit for each pump, a valve for each by-pass of the pressure responsive, substantially balanced opposed areas type, each valve being resiliently biased to a position closing the by-pass controlled thereby and opening the by-pass in response to a predetermined differential operating pressure on the pressure responsive areas of the valve, a branch circuit connecting the delivery pressure of one of said pumps to the responsive areas of both valves, and valve means in the branch circuit responsive at a predetermined delivery pressure of the said one pump to create a pressure differential on the pressure responsive areas of both of said valves of a value for operating both of said valves to the open by-pass position.

6. In a hydraulic power transmission system the combination of a fluid motor, a pair of fluid pumps of different volumetric displacements mechanically coupled to a prime mover and hydraulically connected in a parallel circuit to the motor for driving the same, means forming a separate by-pass in the circuit for each pump, a valve for each by-pass of the pressure responsive, substantially balanced opposed areas type, each valve being resiliently biased to a position closing the by-pass controlled thereby and opening the by-pass in response to a predetermined differential operating pressure on the pressure responsive areas of the valve, a branch circuit connecting the delivery pressure of one of said pumps having the smaller volumetric displacement to the responsive areas of both valves, and valve means in the branch circuit responsive at a predetermined delivery pressure of the said one pump to create a pressure differential on the pressure responsive areas of both of said valves of a value for operating both of said valves to the open by-pass position.

7. In a hydraulic power transmission system the combination of a fluid motor, a pair of fluid pumps mechanically coupled to a prime mover and hydraulically connected in a parallel circuit to the motor for driving the same, means forming a separate by-pass in the circuit for each pump, a valve for each by-pass of the pressure responsive, substantially balanced opposed areas type, each valve being resiliently biased to a position closing the by-pass controlled thereby and opening the by-pass in response to a predetermined differential operating pressure on the pressure responsive areas of the valve, a branch circuit connecting the delivery pressure of one of said pumps to the responsive areas of both valves, valve means in the branch circuit responsive at a predetermined delivery pressure of the said one pump to create a pressure differential on the pressure responsive areas of both of said valves of a value for operating both of said valves to the open by-pass position, and adjusting means for the valve means for determining the delivery pressure of the said one pump at which both of said valves will be operated to the open by-pass position.

8. In a hydraulic power transmission system including a pair of fixed displacement fluid pumps mechanically coupled to a prime mover and hydraulically connected in parallel to a fluid motor for driving the same, the combination of a by-pass valve for each pump, each valve having substantially balanced opposed pressure responsive areas and being resiliently biased to the closed position, each valve having a control chamber which when vented creates a pressure differential for operating the valve to the open position, a branch circuit connecting the delivery pressure of one of said pumps to the opposed areas of both of said valves, and a valve in the branch circuit for venting the control chambers of both of said by-pass valves and resiliently biased to the closed position, said branch circuit valve being operable at predetermined delivery pressures of the said one pump to the open position to vent the control chambers of both valves to create pressure differentials of a value for operating said by-pass valves to the open position.

9. In a hydraulic power transmission system including a pair of fixed dissimilar displacement fluid pumps mechanically coupled to a prime mover and hydraulically connected in parallel to a fluid motor for driving the same, the combination of a by-pass valve for each pump, each valve having substantially balanced opposed pressure responsive areas and being resiliently biased to the closed position, each valve having a control chamber which when vented creates a pressure differential for operating the valve to the open position, a branch circuit connecting the delivery pressure of one of said pumps having the smaller displacement to the opposed areas of both of said valves, a valve in the branch circuit for venting the control chambers of both of said by-pass valves and resiliently biased to the closed position, said branch circuit valve being operable at predetermined delivery pressures of the said one pump to the open position to vent the control chambers of both valves to create pressure differentials of a value for operating said by-pass valves to the open position, and adjusting means for the branch circuit valve to determine the delivery pressures of the said one pump at which the by-pass valves are operated to the open position.

10. In a hydraulic power transmission system including a pair of fluid pumps of different volumetric displacements and mechanically coupled to a prime mover, each pump having a delivery conduit leading to a main delivery conduit adapted to be selectively connected to a fluid motor for driving a load device, the combination of an unloading valve for the delivery conduit of the larger displacement pump and a by-pass valve for the other delivery conduit, each valve being of the type having substantially balanced, opposed pressure operating surfaces and being resiliently biased to the closed position, means forming a branch circuit connecting the delivery conduit of the smaller displacement pump to the opposed operating surfaces of both valves, and a valve responsive to a predetermined delivery pressure of the smaller displacement pump for creating a differential of operating pressures on the opposed operating surfaces of the unloading and by-pass valves for operating said valves to unload the larger displacement pump and produce a controlled delivery pressure of the smaller displacement pump.

11. In a hydraulic power transmission system including a pair of fluid pumps of different volumetric displacements and mechanically coupled to a prime mover, each pump having a delivery conduit leading to a main delivery conduit adapted to be selectively connected to a fluid motor for driving a load device, the combination of an unloading valve for the delivery conduit of the larger displacement pump and a by-pass valve for the other delivery conduit, each valve being of the type having substantially balanced opposed pressure operating surfaces, each valve including resilient means biasing the same to the closed position the resistance of which determines the differential pressure on the opposed operating surfaces at which the valve is operated to the open position, a branch circuit connecting the delivery conduit of the smaller displacement pump to the opposed operating surfaces of both valves, and valve means also connected to the delivery conduit of the smaller displacement pump and responsive at predetermined delivery pressures of the smaller pump to create differential operating pressures on the opposed operating surfaces of the unloading and by-pass valves for operating the same to the open position.

12. In a hydraulic power transmission system including a pair of fluid pumps of different volumetric displacements and mechanically coupled to a prime mover, each pump having a delivery conduit leading to a main delivery conduit adapted to be selectively connected to a fluid motor for driving a load device, the combination of an unloading valve for the delivery conduit of the larger displacement pump and a by-pass valve for the other delivery conduit, each valve being of the type having substantially balanced, opposed pressure operating surfaces and being resiliently biased to the closed position, means forming a branch circuit connecting the delivery conduit of the smaller displacement pump to the opposed operating surfaces of both valves, a check valve beyond the unloading valve in the delivery conduit of the larger displacement pump, and a valve responsive to a predetermined delivery pressure of the smaller displacement pump for creating a differential of operating pressures on the opposed operating surfaces of the unloading and by-pass valves for operating said valves to unload the larger displacement pump and produce a controlled delivery pressure of the smaller displacement pump.

References Cited in the file of this patent
UNITED STATES PATENTS

| | | |
|---|---|---|
| 1,982,711 | Vickers | Dec. 4, 1934 |